US012804365B2

(12) United States Patent
Nagashima et al.

(10) Patent No.: US 12,804,365 B2
(45) Date of Patent: Nov. 17, 2026

(54) INFORMATION NOTIFICATION APPARATUS, METHOD, AND COMPUTER-READABLE MEDIUM

(71) Applicant: NEC Corporation, Tokyo (JP)

(72) Inventors: Seito Nagashima, Tokyo (JP); Sawaka Seki, Tokyo (JP); Takashi Nunomoto, Tokyo (JP); Takumi Shiba, Tokyo (JP); Hitomi Ito, Tokyo (JP); Masaru Yanai, Tokyo (JP); Kosei Kobayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 267 days.

(21) Appl. No.: 18/699,906

(22) PCT Filed: Nov. 4, 2021

(86) PCT No.: PCT/JP2021/040535
§ 371 (c)(1),
(2) Date: Apr. 10, 2024

(87) PCT Pub. No.: WO2023/079609
PCT Pub. Date: May 11, 2023

(65) Prior Publication Data
US 2024/0406692 A1 Dec. 5, 2024

(51) Int. Cl.
*H04W 4/46* (2018.01)
*H04W 4/021* (2018.01)

(52) U.S. Cl.
CPC ............. *H04W 4/46* (2018.02); *H04W 4/022* (2013.01)

(58) Field of Classification Search
CPC ................................ H04W 4/46; H04W 4/022
See application file for complete search history.

(56) References Cited

U.S. PATENT DOCUMENTS

2022/0297600 A1* 9/2022 Kawahara ........... B60W 30/095

FOREIGN PATENT DOCUMENTS

| | | | |
|---|---|---|---|
| JP | 2009-278382 | A | 11/2009 |
| JP | 2017-117249 | A | 6/2017 |
| JP | 2021-009424 | A | 1/2021 |
| WO | 2020/111133 | A1 | 6/2020 |

OTHER PUBLICATIONS

International Search Report for PCT Application No. PCT/JP2021/040535, mailed on Jan. 18, 2022.

* cited by examiner

*Primary Examiner* — Curtis B Odom
(74) *Attorney, Agent, or Firm* — Sughrue Mion, PLLC

(57) ABSTRACT

A detection means detects an object. A warning area setting means sets a warning area around the detected object. A notification means notifies a moving entity in the warning area of the presence of the detected object. The warning area setting means sets the warning area of a size according to at least one of detection quality information on detection accuracy of the detected object and notification communication quality information on communication quality of communication used for notifying the moving entity.

11 Claims, 7 Drawing Sheets

INFORMATION NOTIFICATION APPARATUS, METHOD, AND COMPUTER-READABLE MEDIUM

This application is a National Stage Entry of PCT/JP2021/040535 filed on Nov. 4, 2021, the contents of all of which are incorporated herein by reference, in their entirety.

TECHNICAL FIELD

The present disclosure relates to an information notification apparatus, information notification method, and a computer-readable medium.

BACKGROUND ART

In recent years, technological development of inter-vehicle communication that involves communication between vehicles such as automobiles and vehicle-to-roadside communication that involves communication between a vehicle and a roadside unit (RSU) installed on the road, has been progressing. As a related technology, Patent Literature 1 discloses a roadside communication apparatus. The roadside communication apparatus described in Patent Literature 1 uses a roadside monitoring camera to determine whether or not a vehicle other than the vehicle with which inter-vehicle communication is established is located within a communication area. If the vehicle other than the vehicle with which inter-vehicle communication is established is located within the communication area, the roadside communication apparatus collects the data being transmitted and received by the inter-vehicle communication. The roadside communication apparatus transmits the collected data in broadcast mode to all vehicles present in the communication area.

CITATION LIST

Patent Literature

Japanese Unexamined Patent Application Publication No. 2009-278382

SUMMARY OF INVENTION

Technical Problem

In Patent Literature 1, the roadside communication apparatus collects data that are transmitted by inter-vehicle communication to the effect that "an accident has occurred on the road ahead." The roadside communication apparatus uniformly transmits the collected data to the effect that "an accident has occurred on the road ahead" to all vehicles in the communication area. However, since the collected data is uniformly transmitted to all vehicles in the communication area in Patent Literature 1, it is not possible to notify information such as "an accident has occurred on the road ahead" to an appropriate range of vehicles.

In view of the above circumstance, an objective of the present disclosure is to provide an information notification apparatus, an information notification method, and a computer-readable medium that can appropriately notify information to a moving entity.

Solution to Problem

In order to achieve the above-mentioned objective, the present disclosure provides, as a first aspect, an information notification apparatus. The information notification apparatus includes: a detection means for detecting an object; a warning area setting means for setting a warning area around the detected object; and a notification means for notifying a moving entity in the warning area of presence of the detected object. In the information notification apparatus, the warning area setting means sets the warning area of a size according to at least one of detection quality information on detection accuracy of the detected object and notification communication quality information on communication quality of communication used for notifying the moving entity.

The present disclosure provides, as a second aspect, an information notification apparatus. The information notification apparatus includes: a detection means for detecting an object; a warning area setting means for setting a warning area around the detected object; and a notification means for notifying the detected object of presence of a moving entity in the warning area. In the information notification apparatus, the warning area setting means sets the warning area of a size according to at least one of detection quality information on detection accuracy of the detected object and notification communication quality information on communication quality of the communication used for notifying the object.

The present disclosure provides, as a third aspect, an information notification method. The information provision method includes: detecting an object; setting a warning area, around the detected object, of a size according to at least one of detection quality information on detection accuracy of the detected object and notification communication quality information on communication quality of communication used when notifying a moving entity of presence of the object; and notifying the moving entity in the warning area of the presence of the detected object.

The present disclosure provides, as a fourth aspect, an information notification method. The information provision method includes: detecting an object; setting a warning area, around the detected object, of a size according to at least one of detection quality information on detection accuracy of the detected object and notification communication quality information on communication quality of communication used when notifying a moving entity of presence of the object; and notifying the detected object of the presence the moving entity in the warning area.

The present disclosure provides, as a fifth aspect, a computer-readable medium. The computer-readable medium stores a program for causing a computer to perform: detecting an object; setting a warning area, around the detected object, of a size according to at least one of detection quality information on detection accuracy of the detected object and notification communication quality information on communication quality of communication used when notifying a moving entity of presence of the object; and notifying the moving entity in the warning area of the presence of the detected object.

The present disclosure provides, as a sixth aspect, a computer-readable medium. The computer-readable medium stores a program for causing a computer to perform: detecting an object; setting a warning area, around the detected object, of a size according to at least one of detection quality information on detection accuracy of the detected object and notification communication quality information on communication quality of communication used when notifying a moving entity of presence of the object; and notifying the detected object of the presence the moving entity in the warning area.

Advantageous Effects of Invention

The information notification apparatus, information notification method, and computer-readable medium of the present disclosure can appropriately notify a moving entity of information.

EXAMPLE EMBODIMENT

Figure 1:
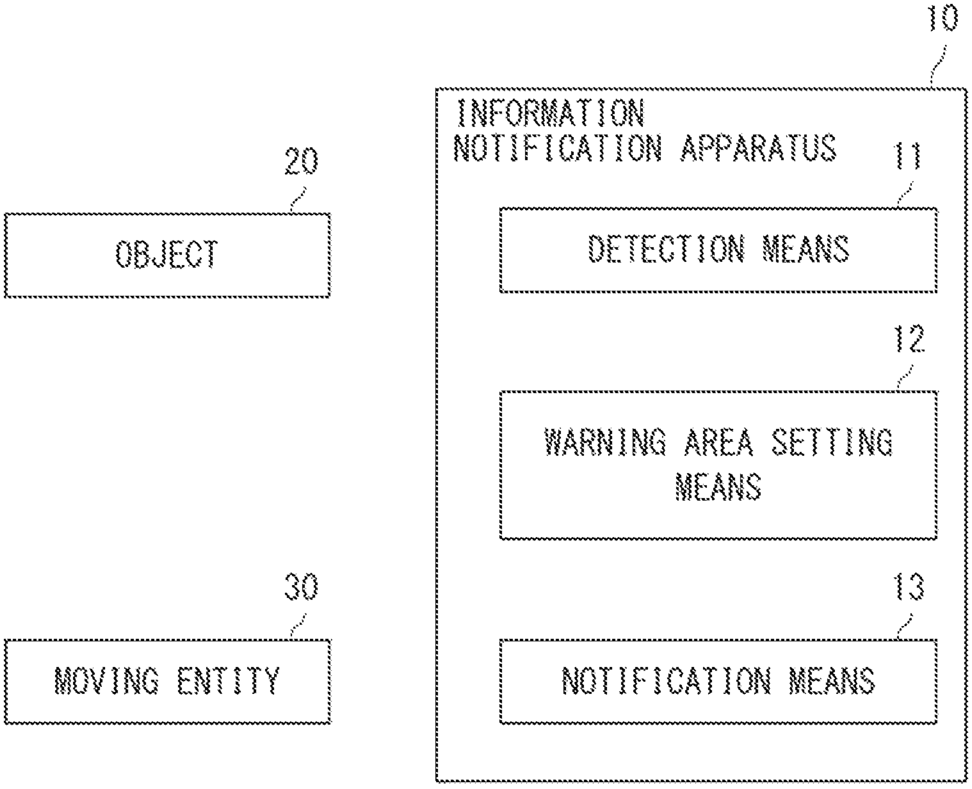
FIG. 1 is a block diagram illustrating a schematic configuration example of the information notification apparatus according to the present disclosure.

Prior to the description of the example embodiment of the present disclosure, an overview of the present disclosure is described below. FIG. 1 illustrates a schematic configuration example of an information notification apparatus according to the present disclosure. The information notification apparatus 10 has a detection means 11, a warning area setting means 12, and a notification means 13. The detection means 11 detects an object 20. The object 20 may be a vehicle, such as a motorcycle, without limitation to any particular object. The detection means 11 can detect the object 20, based on, for example, a video captured by a camera and sensor data output by a sensor sensing a vehicle on a road. The detection means 11 may detect the object 20, based on, for example, location information transmitted from the object.

The warning area setting means 12 sets a warning area around the object 20 detected by the detection means 11. The notification means 13 notifies a moving entity 30 within the warning area set by warning area setting means 12 of the presence of the detected object 20. In the present disclosure, the warning area setting means 12 sets the warning area of a size according to detection quality information on the detection accuracy of the detected object 20. Alternatively, the warning area setting means 12 sets the warning area of a size according to the notification communication quality information on the communication quality of the communication used for notifying the moving entity 30. The warning area setting means 12 may set the warning area of a size according to both the detection quality information and the communication quality information.

In the present disclosure, the warning area setting means 12 sets a warning area around the detected object 20. The notification means 13 notifies the moving entity 30 within the warning area of the presence of the object 20. In the present disclosure, since the presence of the object 20 is notified to the moving entity 30 within the warning area, the moving entity 30 that exists at a position far from the object 20 is not notified of the presence of the object. Therefore, the present disclosure can suppress unnecessary notifications to the moving entity 30 and can appropriately notify information to the moving entity 30.

In the present disclosure, the warning area setting means 12 sets the warning area of a size according to at least one of the detection quality information and the communication quality information. For example, the detection accuracy of the object 20 may vary depending on weather conditions. Specifically, the detection accuracy of the object 20 may decrease on rainy days than on sunny days. In addition, when the detection means 11 detects the object 20 by collecting location information from the object 20, the detection accuracy of the object 20 may vary depending on the communication environment of the communication used for collecting location information. Furthermore, when the communication environment of the communication used for notifying the moving entity 30 is poor, there may be a delay in communication, resulting in a delay in notification to the moving entity 30. In the present disclosure, the size of the warning area can be changed according to at least one of the detection quality information and the communication quality information, and the presence of the object 20 can be notified to the moving entity 30 within an appropriate range according to the situation.

The following describes details of the example embodiment of the present disclosure with reference to the drawings. Note that the following descriptions and drawings have been abbreviated or simplified as appropriate for the sake of clarity of explanation. In each drawing, identical and similar elements are marked with the same symbols, and redundant explanations are omitted where necessary.

Figure 2:
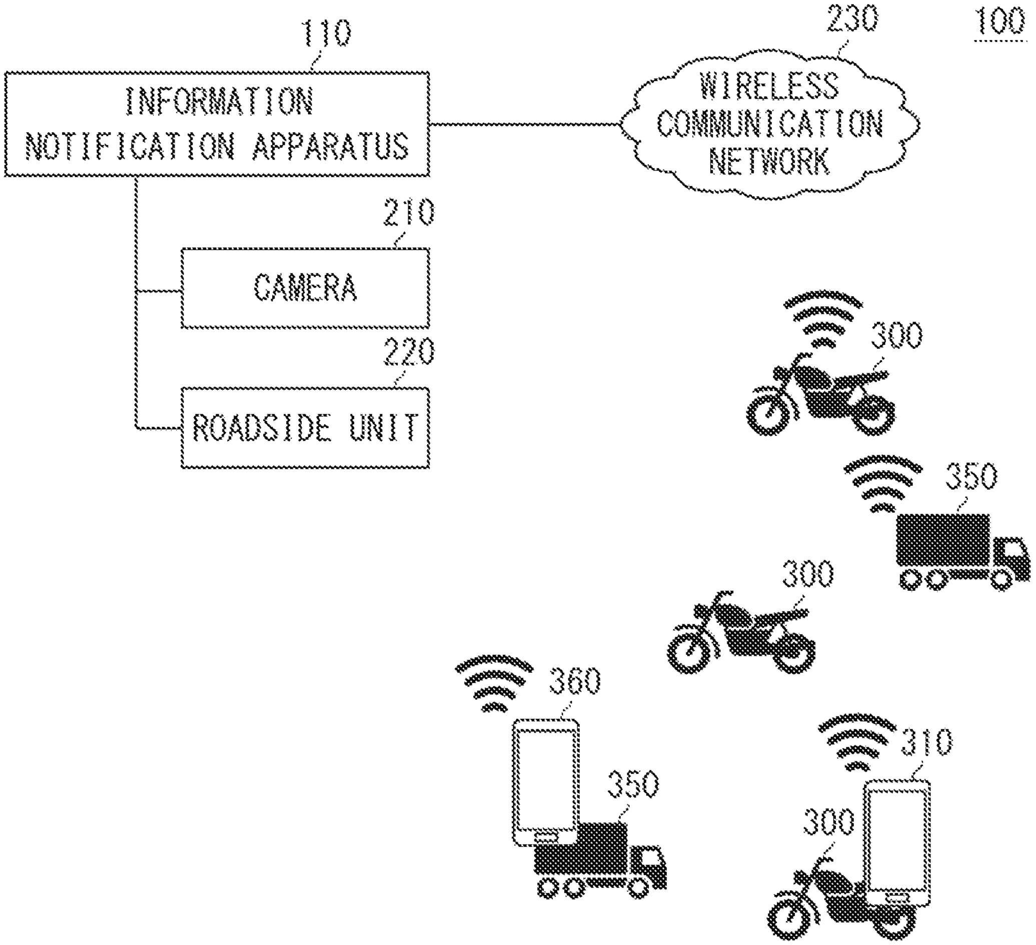
FIG. 2 is a block diagram illustrating an information notification system including an information notification apparatus according to one example embodiment of the present disclosure.

FIG. 2 illustrates an information notification system including an information notification apparatus according to one example embodiment of the present disclosure. The information notification system 100 includes an information notification apparatus 110, a camera 210, and a roadside unit 220. The present example embodiment is an example embodiment in which the information notification apparatus 110 detects a motorcycle 300 and notifies a moving entity 350 in the vicinity of the motorcycle 300 of the presence of the motorcycle 300. Although one camera 210 and one roadside unit 220 are illustrated in FIG. 2, the number of cameras 210 and roadside units 220 is not limited to one. The information notification system 100 can include an arbitrary number of cameras 210 and roadside units 220. The information notification apparatus 110 corresponds to the information notification apparatus 10 illustrated in FIG. 1. The motorcycle 300 corresponds to the object 20 illustrated in FIG. 1. The moving entity 350 corresponds to the moving entity 30 illustrated in FIG. 1.

The camera 210 and the roadside unit 220 are disposed, for example, at an intersection. The camera 210 takes a video of vehicles on the road, for example, in the vicinity of an intersection. The roadside unit 220 includes a wireless communication apparatus that communicates wirelessly with a motorcycle 300 and a moving entity 350 equipped with an on-board communication apparatus. In the information notification system 100, a plurality of cameras 210 and roadside units 220 may be disposed at a single intersection. Alternatively, one or more cameras 210 and roadside units 220 may be disposed at each of a plurality of intersections.

Figure 3:
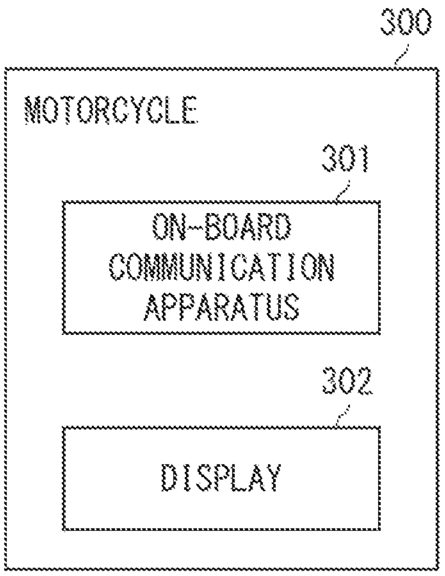
FIG. 3 is a block diagram illustrating an example configuration of a motorcycle.

FIG. 3 illustrates an example configuration of a motorcycle 300. The motorcycle 300 has an on-board communication apparatus 301 and a display 302. The on-board communication apparatus 301 includes a wireless communication apparatus. The on-board communication apparatus 301 performs, for example, long term evolution (LTE) vehicle-to-everything (V2X) direct communication (PC5 communication) with the roadside unit 220. The on-board communication apparatus 301 transmits vehicle information, including location information of the motorcycle 300, to the roadside unit 220. The on-board communication apparatus 301 broadcasts the vehicle information periodically, for example, in cycles of tens of milliseconds to 100 milliseconds. The roadside unit 220 periodically receives the vehicle information transmitted from the on-board communication apparatus 301. The roadside unit 220 transmits the received vehicle information of the motorcycle 300 to the information notification apparatus 110.

The display 302 is a display device for displaying various information to the occupant of the motorcycle 300. For example, a display device such as a liquid crystal display or an organic electro luminescence diode (OLED) display is used for the display 302.

The moving entity 350, like the motorcycle 300, includes an on-board communication apparatus and a display. The on-board communication apparatus of the moving entity 350 periodically broadcasts vehicle information, including location information of the moving entity 350. The roadside unit 220 periodically receives the vehicle information transmitted from the moving entity 350. The roadside unit 220 transmits the received vehicle information of the moving entity 350 to the information notification apparatus 110. The moving entity 350 is configured as a vehicle traveling on the road, such as, a car, a bus, a taxi, or a truck. The moving entity 350 may be configured for automated driving (autonomous) operation, based on information from sensors mounted on the moving entity. The moving entity 350 may be a motorcycle.

In FIG. 2, it is not necessary that all motorcycles 300 and all moving entities 350 are equipped with on-board communication apparatuses. For example, at least some of the motorcycles 300 may be vehicles ridden by users carrying portable communication terminals 310, such as smartphones and tablet-type terminal apparatuses. Similarly, the moving entity 350 may be a vehicle ridden by a user carrying a portable communication terminal 360, such as a smart phone or a tablet-type terminal apparatus. The portable communication terminals 310 and 360 each include a communication unit that performs wireless communication with the wireless communication network 230 and a display. The wireless communication network 230 includes a fourth generation mobile communication system or a wireless communication network using a communication line standard such as LTE. The wireless communication network 230 may include a wireless communication network such as Wi-Fi (registered trademark) or a fifth generation mobile communication system.

The portable communication terminals 310 and 360 each have an application installed for transmitting vehicle information, including location information, to the information notification apparatus 110. The portable communication terminal 310 (and its application) periodically transmits vehicle information, including location information of the motorcycle 300 ridden by the user, to the information notification apparatus 110 via the wireless communication network 230. The portable communication terminal 360 periodically transmits vehicle information, including location information of the moving entity 350 ridden by the user, to the information notification apparatus 110 via the wireless communication network 230.

Note that the motorcycle 300 may be a vehicle equipped with an on-board communication apparatus 301 and ridden by a user who carries a portable communication terminal 310. The motorcycle 300 may instead be a vehicle that is not equipped with an on-board communication apparatus 301 and ridden by a user who does not carry a portable communication terminal 310. The moving entity 350 may be a vehicle equipped with an on-board communication apparatus and ridden by a user who carries portable communication terminals 310 and 360.

Figure 4:
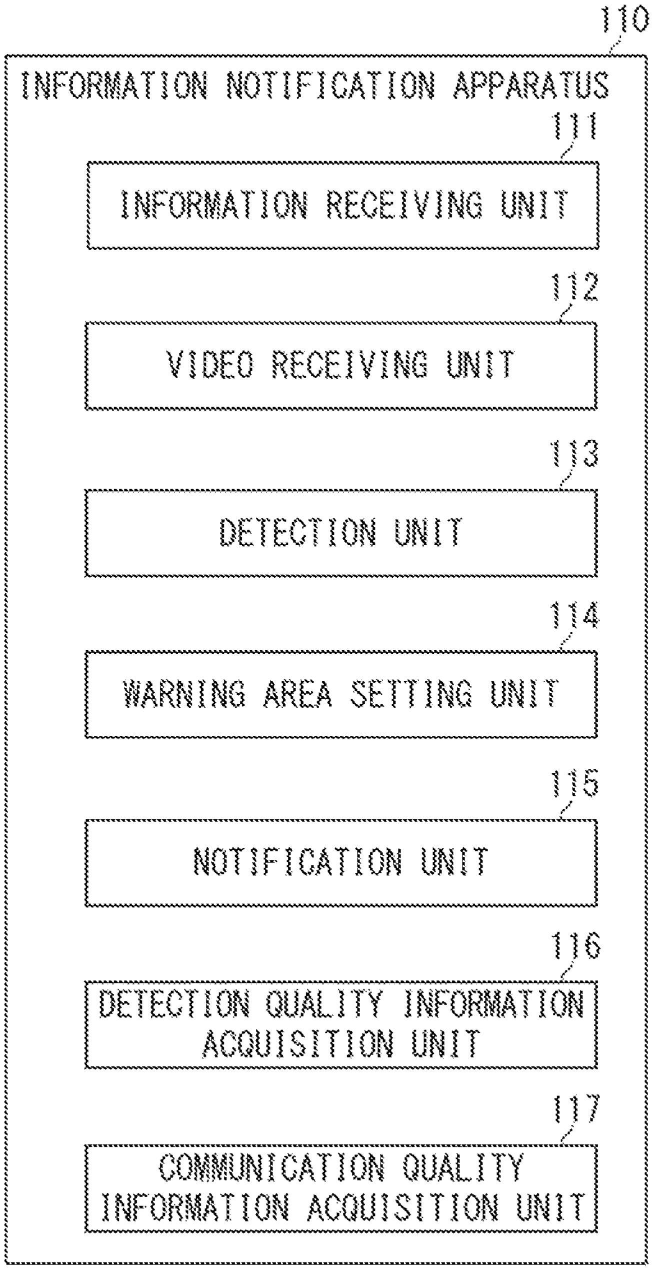
FIG. 4 is a block diagram illustrating an example configuration of the information notification apparatus.

FIG. 4 illustrates an example configuration of the information notification apparatus 110. The information notification apparatus 110 has an information receiving unit 111, a video receiving unit 112, a detection unit 113, a warning area setting unit 114, a notification unit 115, a detection quality information acquisition unit 116, and a communication quality information acquisition unit 117. The information notification apparatus 110 is configured as an apparatus including, for example, one or more processors and one or more memories. At least part of the function of each unit in the information notification apparatus 110 can be realized by the processor executing processing in accordance with a program read from the memory.

Although only one information notification apparatus 110 is illustrated in FIG. 2, the information notification system 100 may have a plurality of information notification apparatuses 110. For example, in the information notification system 100, the information notification apparatus 110 may be disposed at each intersection where a camera 210 or a roadside unit 220 is installed. The information notification apparatus 110 may be disposed at each area that includes a plurality of intersections. The information notification apparatus 110 may be configured, for example, as a mobile/multi-access edge computing (MEC) server.

The information receiving unit 111 receives, from the roadside unit 220, vehicle information transmitted from the motorcycle 300 and the moving entity 350. In other words, the information receiving unit 111 receives the vehicle information of the motorcycle 300 and the moving entity 350 from the motorcycle 300 and the moving entity 350 via the roadside unit 220. The information receiving unit 111 also receives vehicle information of the motorcycle 300 and the moving entity 350 from the portable communication terminals 310 and 360 via the wireless communication network 230. The vehicle information of the motorcycle 300 received by the information receiving unit 111 includes, for example, the location information, speed, acceleration, and direction of travel (heading) of the motorcycle 300. The vehicle information of the moving entity 350 received by the information receiving unit 111 includes, for example, the location information, speed, acceleration, and direction of travel of the moving entity 350. The video receiving unit 112 receives a captured video from the camera 210.

The detection unit 113 detects the motorcycle 300 as a detection target. In the present example embodiment, the detection unit 113 detects the location of the motorcycle 300, based on at least one of the vehicle information of the motorcycle 300 received by the information receiving unit 111 and the video received by the video receiving unit 112. The detection unit 113 can detect the motorcycle 300 by using at least one of a plurality of detection methods. The plurality of detection methods include, for example, a first detection method of detecting the motorcycle 300 by using a video from the camera 210. The plurality of detection methods also include a second detection method of detecting the motorcycle 300, based on the location information of the motorcycle 300 received via the wireless communication network 230. Further, the plurality of detection methods include a third detection method of detecting the motorcycle 300, based on the location information of the motorcycle 300 received via the roadside unit 220.

When detecting the motorcycle 300 by using the first detection method, the detection unit 113 acquires the video captured by the camera 210 from the video receiving unit 112. The detection unit 113 performs video analysis on the acquired video to detect the location of the motorcycle 300 included in the video. Instead of detecting the location of the motorcycle 300 by using the video from the camera 210, the detection unit 113 may also detect the location of the motorcycle 300 by using a sensor such as light detection and ranging (LiDAR) to detect the location of the motorcycle 300, based on sensor data (for example, 3-D point cloud data) obtained from the sensor. When the detection unit 113 has detected a motorcycle 300, the detection unit 113 tracks the location of the motorcycle 300 as it travels.

When detecting the motorcycle 300 by using the second detection method, the detection unit 113 acquires from the information receiving unit 111 the location information that is transmitted from the portable communication terminal 310 and received via the wireless communication network 230. The detection unit 113 detects the location indicated by the location information transmitted from the portable communication terminal 310 as the location of the motorcycle 300. When detecting the motorcycle 300 by using the third detection method, the detection unit 113 acquires from the information receiving unit 111 the location information of the motorcycle 300 that is transmitted from the on-board communication apparatus 301 (refer to FIG. 3) and received via the roadside unit 220. The detection unit 113 detects the location indicated by the location information transmitted from the on-board communication apparatus 301 as the location of the motorcycle 300. The detection unit 113 may predict the location of the motorcycle 300 after a predetermined time and detect the predicted location as the location of the motorcycle 300. The detection unit 113 corresponds to the detection means 11 illustrated in FIG. 1.

The warning area setting unit 114 sets a warning area around the motorcycle 300 detected by the detection unit 113. The warning area setting unit 114 may set a range of several tens of meters to 100 meters from the motorcycle 300 as a warning area, taking into consideration the braking distance of the moving entity 350 that is traveling. The warning area setting unit 114 corresponds to the warning area setting means 12 illustrated in FIG. 1. Details of the setting of the warning area in the warning area setting unit 114 are described below.

The notification unit 115 notifies the moving entity 350 in the warning area of the presence of the motorcycle 300. The notification unit 115 compares, for example, location information included in vehicle information received from each of one or more moving entities 350 and the warning area set by the warning area setting unit 114. The notification unit 115 identifies the moving entity 350 that is present in the warning area and the moving entity 350 that is entering the warning area. The notification unit 115 notifies the identified moving entities 350 of the presence of the motorcycle 300. For example, the notification unit 115 notifies the on-board communication apparatus mounted on the moving entity 350 of the presence of the motorcycle 300 via the roadside unit 220. Alternatively, the notification unit 115 may notify the portable communication terminal 360 of a user riding the moving entity 350 of the presence of the motorcycle 300 via the wireless communication network 230.

The notification unit 115 may notify the moving entity 350 of the presence of the motorcycle 300 when the moving entity 350 is heading toward an intersection in the warning area where the moving entity 350 might collide with the detected motorcycle 300. For example, consider a case where the motorcycle 300 and the moving entity 350 are traveling in the same direction and the motorcycle 300 is located behind the moving entity 350. In such a case, if the moving entity 350 is heading toward an intersection where the motorcycle 300 is going straight and the moving entity 350 is turning left (when traveling on the right side of the road), the moving entity 350 may be notified of the presence of the motorcycle 300. When the motorcycle 300 and the moving entity 350 travel in opposite directions, if the moving entity 350 is heading toward an intersection where the motorcycle 300 is going straight and the moving entity 350 is turning right (when traveling on the right side of the road), the moving entity 350 may be notified of the presence of the motorcycle 300.

When the moving entity 350 includes an on-board communication apparatus and the user riding the moving entity 350 has a portable communication terminal 360, the notification unit 115 may notify either the on-board communication apparatus or the portable communication terminal 360 of the presence of the motorcycle 300. For example, the notification unit 115 may notify the apparatus that the user has previously set as a preferred apparatus among the on-board communication apparatus and the portable communication terminal 360 of the presence of the motorcycle 300. Alternatively, the notification unit 115 may notify both the on-board communication apparatus and the portable communication terminal 360 of the presence of the motorcycle 300. The notification unit 115 corresponds to the notification means 13 illustrated in FIG. 1.

Upon receiving the notification, the moving entity 350 displays on its display a message or the like indicating the presence of a motorcycle in the vicinity. When the notification unit 115 notifies the portable communication terminal 360, the portable communication terminal 360 displays on its display a message indicating the presence of a motorcycle in the vicinity. The driver of the moving entity 350 can drive the moving entity 350 while keeping an eye out for the motorcycle 300. If the moving entity 350 is a self-driving vehicle, the moving entity 350 may switch its automated driving control to a safer control when notified of the presence of the motorcycle 300. For example, the moving entity 350 may perform automated driving without implementing overtaking or lane changes when notified of the presence of the motorcycle 300.

The detection quality information acquisition unit 116 acquires detection quality information of the motorcycle 300 detected by the detection unit 113. The detection quality information herein indicates information on the detection accuracy of the detected motorcycle 300. The detection quality information includes, for example, information for identifying the detection method used for detecting the motorcycle 300. For example, when the location of the motorcycle 300 is detected by using a video from the camera 210, the detection quality information acquisition unit 116 includes information indicating that the first detection method is used for detecting the motorcycle 300 in the detection quality information. When the location of the motorcycle 300 is detected based on the location information transmitted from the portable communication terminal 310, the detection quality information acquisition unit 116 includes information indicating that the second detection method is used for detecting the motorcycle 300 in the detection quality information. When the location of the motorcycle 300 is detected based on the location information transmitted from the on-board communication apparatus 301, the detection quality information acquisition unit 116 includes information indicating that the second detection method is used for detecting the motorcycle 300 in the detection quality information.

The above detection quality information can include information on the surrounding environment at the location where the motorcycle 300 is detected. The surrounding environment information includes, for example, information on the weather. The detection quality information includes communication environment information of the wireless communication (for example, PC5 communication) between and the motorcycle 300 the roadside unit 220 used for receiving the location information. Alternatively or in addition, the detection quality information includes communication environment information of the wireless communication network 230 used for receiving the location information. The communication environment information can include, for example, at least one of signal strength, transmission interval (cycle), and communication congestion of the roadside unit 220 and the base station included in the wireless communication network 230 associated with the transmission of the location information. The communication environment information is associated with the communication response of the location information.

The communication quality information acquisition unit 117 acquires notification communication quality information related to the communication quality of the communication used for notifying the moving entity 350. The notification communication quality information can include, for example, at least one of signal strength, transmission interval (cycle), and communication congestion of the roadside unit 220 and the base station included in the wireless communication network 230 related to the transmission of the notification to the moving entity 350. The notification communication quality information relates to the communication response of the notification transmitted to the moving entity 350.

Here, the detection accuracy of the motorcycle 300 is considered to differ between the case where the motorcycle 300 is detected by using the video from the camera 210 and the case where the motorcycle 300 is detected based on vehicle information (location information) transmitted from the motorcycle 300 or the portable communication terminal 310. The transmission interval of the location information is also considered to differ between the case where the location information is transmitted from the on-board communication apparatus 301 (refer to FIG. 3) and the case where the location information is transmitted from the portable communication terminal 310 via the wireless communication network 230. In the case where location information is used, a poor communication environment, such as low signal strength, may cause packet retransmissions, resulting in communication delays. When the reception interval of location information at the information notification apparatus 110 is long, the accuracy of the detected location of the motorcycle 300 is considered to be lower than when the reception interval is short.

In the present example embodiment, the warning area setting unit 114 sets a warning area of a size according to at least one of the detection quality information and the notification communication quality information. For example, when the detection quality information includes information for identifying the detection method used for detecting the motorcycle 300, the warning area setting unit 114 may determine the size of the warning area according to the information for identifying the detection method. In such a case, the warning area setting unit 114 may change the size of the warning area depending on whether the first detection method is used, the second detection method is used, or the third detection method is used. When the detection quality information includes at least one of the surrounding environment information and the communication environment information, the warning area setting unit 114 may determine the size of the warning area according to at least one of the surrounding environment information and the communication environment information. The warning area setting unit 114 may set the warning area wider when the environmental conditions are bad in the surrounding environment information and the communication environment information than when the environmental conditions are good.

Figure 5:
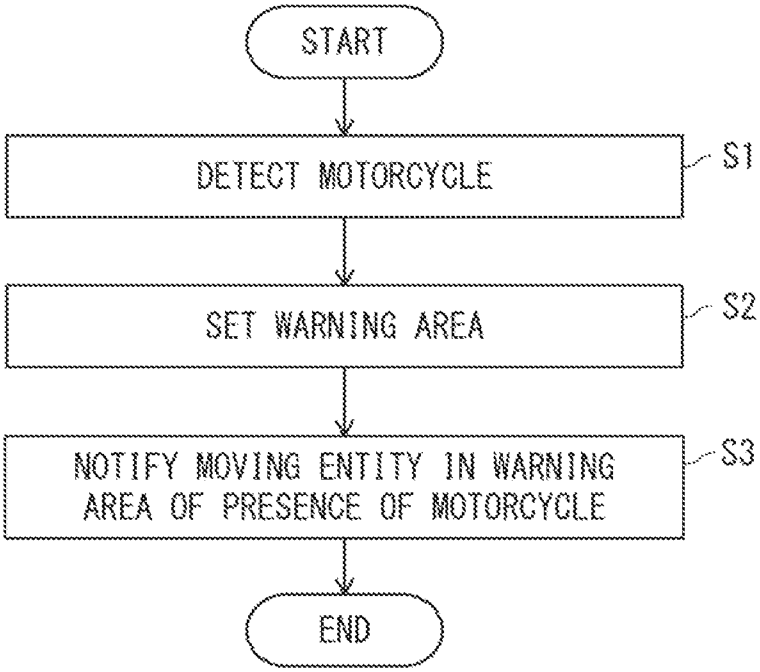
FIG. 5 is a flowchart illustrating an operating procedure of the information notification apparatus.

The following describes the operating procedure. FIG. 5 illustrates the operating procedure (information notification method) of the information notification apparatus 110. The detection unit 113 detects a motorcycle 300 as a detection target (step S1). At step S1, the detection unit 113 detects the location of the motorcycle 300 by using the video from the camera received by the video receiving unit 112. At step S1, the detection unit 113 detects the location of the motorcycle 300, based on the location information of the motorcycle 300 received by the information receiving unit 111 via the roadside unit 220 or the wireless communication network 230.

The warning area setting unit 114 sets a warning area around the motorcycle 300 detected at step S1 (step S2). At step S2, the warning area setting unit 114 sets the warning area of a size according to at least one of the detection quality information acquired by the detection quality information acquisition unit 116 and the notification communication quality information acquired by the communication quality information acquisition unit 117. If a plurality of motorcycles 300 are detected at step S1, the warning area setting unit 114 sets a warning area for each of the plurality of motorcycles 300. The notification unit 115 notifies the moving entity 350 within the warning area that is set at step S2 of the presence of the motorcycle 300 (step S3).

Figure 6:
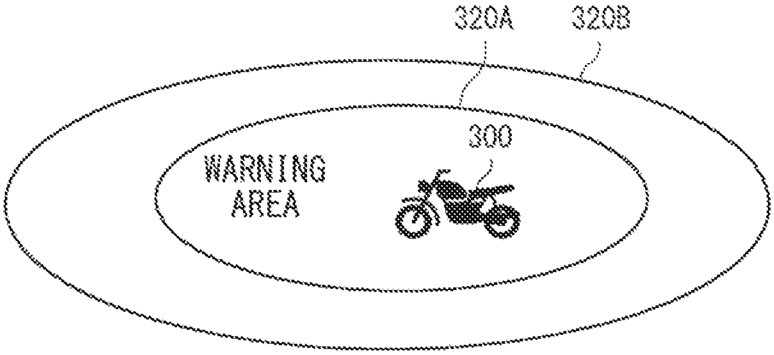
FIG. 6 is a schematic diagram illustrating an example of warning area setting.
Figure 7:
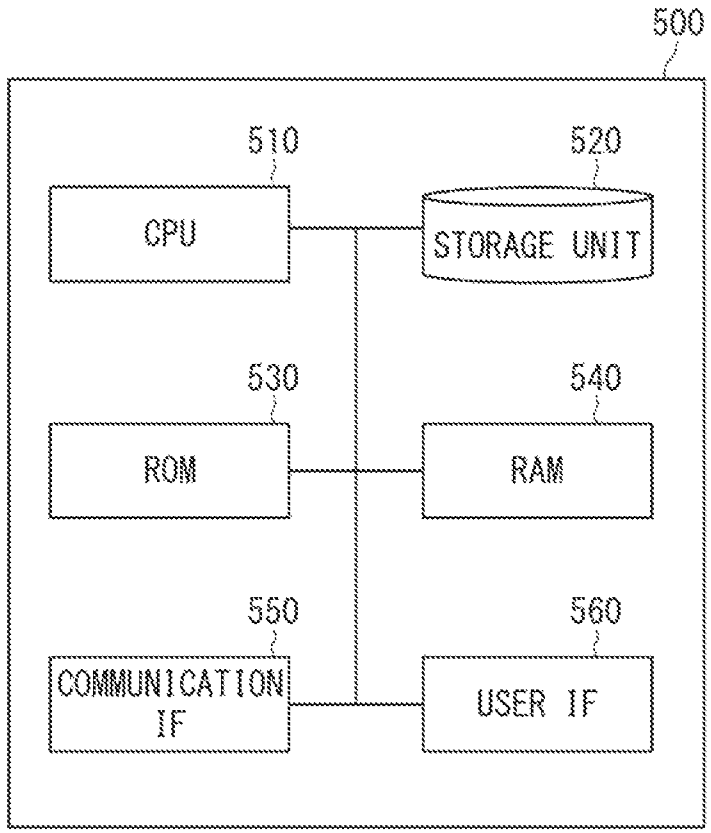
FIG. 7 is a block diagram illustrating an example configuration of a computer apparatus.

FIG. 6 illustrates an example of warning area setting. Suppose that in a situation, the surrounding environment information included in the detection quality information is first surrounding environment information. In this case, the warning area setting unit 114 is assumed to set the first warning area 320A illustrated in FIG. 6. In another situation, suppose that the surrounding environment information included in the detection quality information is second surrounding environment information. The second surrounding environment information is assumed to have worse environmental conditions than the first surrounding environment information. Worse environmental conditions in the surrounding environment information indicate, for example, that it is raining or snowing or that the illumination level is low. If the environmental conditions worsen, the detection accuracy of the motorcycle 300 is expected to decrease, and the detected location of the motorcycle 300 is expected to fluctuate. In such a case, the warning area setting unit 114 sets the warning area to the second warning area 320B that is wider than the first warning area 320A. If the warning area is widened, the range that a notification can reach the moving entity 350 can be expanded to the extent that the warning area is widened.

Suppose that in a situation, the communication environment information included in the detection quality information is first communication environment information. In such a case, the warning area setting unit 114 is assumed to set the first warning area 320A illustrated in FIG. 6. In another situation, suppose that the communication environment information included in the detection quality information is second communication environment information. The second communication environment information is assumed to have worse environmental conditions than the first communication environment information. Worse environmental conditions of the communication environment information indicate, for example, that the signal strength is lower, that the transmission interval of location information is longer, or that communication is congested. If the environmental conditions worsen, the detection accuracy of the motorcycle 300 is expected to decrease, and the detected location of the 300 motorcycle is expected to fluctuate. In such a case, the warning area setting unit 114 sets the warning area to the second warning area 320B that is wider than the first warning area 320A. If the warning area is widened, the range that a notification can reach the moving entity 350 can be expanded to the extent that the warning area is widened.

Further, suppose that in a situation, the notification communication environment information included in the notification quality information is the notification communication environment information. In such a case, the warning area setting unit 114 is assumed to set the first warning area 320A illustrated in FIG. 6. In another situation, suppose that the notification environment information included in the notification quality information is second notification communication environment information. The second notification communication environment information is assumed to have worse environmental conditions than the first notification communication environment information. Worse environmental conditions for the notification communication environment information indicate, for example, that the signal strength is lower or that communication is congested. If the environmental conditions worsen, notification to the moving entity 350 is considered to be delayed. In such a case, the warning area setting unit 114 sets the warning area to the second warning area 320B that is wider than the first warning area 320A. If the warning area is widened, the notification can be delivered to the moving entity 350 at a distance from the motorcycle 300 to the extent that the warning area is widened.

In the present example embodiment, the warning area setting unit 114 sets the warning area of a size according to at least one of the detection quality information and the notification communication quality information. If the detection accuracy of the motorcycle 300 decreases, there may be a discrepancy between the detected location and the actual location of the detected motorcycle 300. If the detected location of the motorcycle 300 is not accurate and the size of the warning area set accordingly is uniform, the moving entity 350 that should be notified may not be notified of the presence of the motorcycle 300. In the present example embodiment, the size of the detection area can be set according to the detection quality information, and the presence of the motorcycle 300 can be appropriately notified to the moving entity 350. When the communication response in notifying the moving entity 350 worsens and the size of the warning area is uniform, the notification timing to the moving entity 350 may be delayed and the detection of the motorcycle 300 may be delayed. In the present example embodiment, the size of the detection area can be set according to the notification quality information, and if the communication response is poor, the warning area range can be expanded so as to notify the moving entity 350 when there is still a little distance to spare.

Note that the above example embodiment has described an example where the detection unit 113 detects a motorcycle 300. However, the present disclosure is not limited to this. The detection target to be detected by the detection unit 113 is not limited to a motorcycle, but may be a bicycle or a pedestrian. Alternatively, the detection target may be a vehicle, such as a car, a bus, and a truck, or an emergency vehicle traveling on the road.

The above example embodiment also describes an example where the notification unit 115 notifies a moving entity 350 of the presence of a motorcycle 300 in the vicinity. However, the present disclosure is not limited to this. For example, the notification unit 115 may, instead of or in addition to notifying the moving entity 350, notify a motorcycle 300 or a portable communication terminal 310 of the presence of the moving entity 350 in the warning area. In such a case, the display of the motorcycle 300 or the display 302 of the portable communication terminal 310 (refer to FIG. 3) displays a message indicating the presence of a moving entity 350 in the vicinity so as to alert the occupant of the motorcycle 300. The notification unit 115 may notify the motorcycle 300 of the presence of the moving entity 350 when the motorcycle 300 is heading toward an intersection where the motorcycle 300 might collide with the moving entity 350 in the warning area.

In the above example embodiment, the information notification apparatus 110 can be configured as a computer apparatus. FIG. 8 illustrates an example configuration of a computer apparatus that can be used as the information notification apparatus 110. The computer apparatus 500 has a control unit (CPU: Central Processing Unit) 510, a storage unit 520, a read only memory (ROM) 530, a random access memory (RAM) 540, a communication interface (IF: Interface) 550 and a user interface 560.

The communication interface 550 is an interface for connecting the computer apparatus 500 to a communication network via wired or wireless communication or other means. The user interface 560 includes a display unit, such as a display. The user interface 560 also includes an input unit, such as a keyboard, a mouse, and a touch panel.

The storage unit 520 is an auxiliary storage device that can maintain various types of data. The storage unit 520 does not necessarily have to be part of the computer apparatus 500, it can be an external storage device or a cloud storage connected to the computer apparatus 500 via a network.

The ROM 530 is a nonvolatile storage device. For example, a semiconductor storage device such as a flash memory with relatively small capacity is used for the ROM 530. A program to be executed by the CPU 510 can be stored in the storage unit 520 or the ROM 530. The storage unit 520 or the ROM 530 stores, for example, various programs for realizing the function of each unit in the information notification apparatus 110.

The above program includes a set of instructions (or a software code) that, when read into a computer, causes the computer to perform one or more of the functions described in the example embodiment. The program may be stored in a non-transitory computer-readable medium or a tangible storage medium. By way of example, but not limitation, the computer-readable medium or tangible storage medium may include RAM, ROM, flash memory, solid-state drive (SSD) or other memory technology, compact disc (CD)-ROM, digital versatile disc (DVD), Blu-ray (registered trademark) disc or other optical disc storages, or magnetic cassette, magnetic tape, magnetic disk storage, or other magnetic storage devices. The program may be transmitted on a temporary computer-readable medium or communication medium. By way of example, but not limitation, the temporary computer-readable medium or communication medium includes electrical, optical, acoustic, or other forms of propagation signals.

The RAM 540 is a volatile storage device. Various semiconductor memory devices such as dynamic random access memory (DRAM) or static random access memory (SRAM) are used for the RAM 540. The RAM 540 is used as an internal buffer that temporarily stores data and the like. The CPU 510 loads a program stored in the storage unit 520 or ROM 530 to the RAM 540 and executes the program. When the CPU 510 executes the program, the function of each unit in the information notification apparatus 110 is realized. The CPU 510 may have an internal buffer that can temporarily store data and the like.

Although the example embodiment of the present disclosure has been described above, the present disclosure is not limited to the example embodiment described above. Any changes or modifications to the above example embodiment that do not depart from the spirit of the present disclosure are also included in the present disclosure.

For example, part or all of the above example embodiment may also be described as, but not limited to, the following supplementary notes.

[Supplementary Note 1]

An information notification apparatus including: a detection means for detecting an object; a warning area setting means for setting a warning area around the detected object; and a notification means for notifying a moving entity in the warning area of presence of the detected object, wherein the warning area setting means sets the warning area of a size according to at least one of detection quality information on detection accuracy of the detected object and notification communication quality information on communication quality of communication used for notifying the moving entity.

[Supplementary Note 2]

The information notification apparatus according to Supplementary Note 1, wherein the detection means detects the object by using at least one of a plurality of detection methods, the detection quality information includes information for identifying a detection method used for detecting the object, and the warning area setting means determines a size of the warning area according to the information for identifying the detection method included in the detection quality information.

[Supplementary Note 3]

The information notification apparatus according to Supplementary Note 2, wherein the plurality of detection methods include: a first detection method of detecting the object by using a camera or a sensor; a second detection method of receiving location information transmitted from the object via a wireless communication network and detecting the object, based on the received location information; and a third detection method of acquiring location information transmitted from the object via wireless communication between a roadside unit and the object and detecting the object, based on the acquired location information.

[Supplementary Note 4]

The information notification apparatus according to Supplementary Note 3, wherein the detection quality information includes at least one of surrounding environment information at a location where the object is detected and communication environment information of at least one of the wireless communication network and the wireless communication.

[Supplementary Note 5]

The information notification apparatus according to Supplementary Note 4, wherein the detection quality information includes surrounding environment information at a location where the object is detected, and, when the surrounding environment information is second surrounding environment information being worse than first surrounding environment information, the warning area setting means sets a wider warning area than a warning area that is set when the surrounding environment information is the first surrounding environment information.

[Supplementary Note 6]

The information notification apparatus according to Supplementary Note 4 or 5, wherein the detection quality information includes at least one of communication environment information of at least one of the wireless communication network and the wireless communication, and, when the communication environment information is second communication environment information being worse than first communication environment information, the warning area setting means sets a warning area wider than a warning area that is set when the communication environment information is the first communication environment information.

[Supplementary Note 7]

The information notification apparatus according to any one of Supplementary Notes 1 to 6, wherein the notification means notifies the moving entity of the presence of the detected object via at least one of a wireless communication network and wireless communication between a roadside unit and the moving entity.

[Supplementary Note 8]

The information notification apparatus according to Supplementary Note 7, wherein the notification communication quality information includes notification communication environment information of the wireless communication network and the wireless communication between the roadside unit and the moving entity, and, when the notification communication environment information is second notification communication environment information being worse than first notification communication environment information, the warning area setting means sets a wider warning area than a warning area that is set when the notification communication environment information is the first notification communication environment information.

[Supplementary Note 9]

The information notification apparatus according to any one of Supplementary Notes 1 to 8, wherein the notification means further notifies the detected object of presence of a moving entity in the warning area.

[Supplementary Note 10] The information notification apparatus according to any one of Supplementary Notes 1 to 9, wherein the object is a motorcycle.

[Supplementary Note 11]

An information notification apparatus including: a detection means for detecting an object; a warning area setting means for setting a warning area around the detected object; and a notification means for notifying the detected object of presence of a moving entity in the warning area, wherein the warning area setting means sets the warning area of a size according to at least one of detection quality information on detection accuracy of the detected object and notification communication quality information on communication quality of communication used for notifying the object.

[Supplementary Note 12]

The information notification apparatus according to Supplementary Note 11, wherein the detection means detects the object by using at least one of a plurality of detection methods, the detection quality information includes information for identifying a detection method used for detecting the object, and the warning area setting means determines a size of the warning area according to information for identifying a detection method included in the detection quality information.

[Supplementary Note 13]

An information notification method including: detecting an object; setting a warning area, around the detected object, of a size according to at least one of detection quality information on detection accuracy of the detected object and notification communication quality information on communication quality of communication used when notifying a moving entity of presence of the object; and notifying a moving entity in the warning area of the presence of the detected object.

[Supplementary Note 14]

An information notification method including: detecting an object; setting a warning area, around the detected object, of a size according to at least one of detection quality information on detection accuracy of the detected object and notification communication quality information on communication quality of communication used when notifying a moving entity of presence of the object; and notifying the detected object of presence of a moving entity in the warning area.

[Supplementary Note 15]

A non-transitory computer-readable medium storing a program for causing a computer to perform processing of: detecting an object; setting a warning area, around the detected object, of a size according to at least one of detection quality information on detection accuracy of the detected object and notification communication quality information on communication quality of communication used when notifying a moving entity of presence of the object; and notifying a moving entity in the warning area of the presence of the detected object.

[Supplementary Note 16]

A non-transitory computer-readable medium storing a program for causing a computer to perform processing of: detecting an object; setting a warning area, around the detected object, of a size according to at least one of detection quality information on detection accuracy of the detected object and notification communication quality information on communication quality of communication used when notifying a moving entity of presence of the object; and notifying the detected object of presence of a moving entity in the warning area.

REFERENCE SIGNS LIST

10 INFORMATION NOTIFICATION APPARATUS
11 DETECTION MEANS
12 WARNING AREA SETTING MEANS
13 NOTIFICATION MEANS
20 OBJECT
30 MOVING ENTITY
100 INFORMATION NOTIFICATION SYSTEM
110 INFORMATION NOTIFICATION APPARATUS
111 INFORMATION RECEIVING UNIT
112 VIDEO RECEIVING UNIT
113 DETECTION UNIT
114 WARNING AREA SETTING UNIT
115 NOTIFICATION UNIT
116 DETECTION QUALITY INFORMATION ACQUISITION UNIT
117 COMMUNICATION QUALITY INFORMATION ACQUISITION UNIT
210 CAMERA
220 ROADSIDE UNIT
230 WIRELESS COMMUNICATION NETWORK
300 MOTORCYCLE
301 ON-BOARD COMMUNICATION APPARATUS
302 DISPLAY
310 PORTABLE COMMUNICATION TERMINAL
320 WARNING AREA
350 MOVING ENTITY
360 PORTABLE COMMUNICATION TERMINAL
500 COMPUTER APPARATUS
510 CPU
520 STORAGE UNIT
530 ROM
540 RAM
550 COMMUNICATION INTERFACE
560 USER INTERFACE

What is claimed is:

1. An information notification apparatus comprising:

at least one memory storing instructions; and at least one processor configured to execute the instructions to:

detect an object by using at least one of a plurality of detection methods;

set a warning area around the detected object; and notify a moving entity in the warning area of presence of the detected object, wherein the processor is configured to execute the instructions to set the warning area of a size according to at least one of detection quality information on detection accuracy of the detected object or notification communication quality information on communication quality of communication used for notifying the moving entity, the detection quality information includes information for identifying a detection method used for detecting the object, and the at least one processor is configured to execute the instructions to determine a size of the warning area according to the information for identifying the detection method included in the detection quality information.

2. The information notification apparatus according to claim 1, wherein the plurality of detection methods include: a first detection method of detecting the object by using a camera or a sensor; a second detection method of receiving location information transmitted from the object via a wireless communication network and detecting the object, based on the received location information; and a third detection method of acquiring location information transmitted from the object via wireless communication between a roadside unit and the object and detecting the object, based on the acquired location information.

3. The information notification apparatus according to claim 2, wherein the detection quality information includes at least one of surrounding environment information at a location where the object is detected or communication environment information of at least one of the wireless communication network or the wireless communication.

4. The information notification apparatus according to claim 3, wherein the detection quality information includes the surrounding environment information at a location where the object is detected, and, when the surrounding environment information is second surrounding environment information being worse than first surrounding environment information, the at least one processor is configured to execute the instructions to set a wider warning area than a warning area that is set when the surrounding environment information is the first surrounding environment information.

5. The information notification apparatus according to claim 3, wherein the detection quality information includes the communication environment information of at least one of the wireless communication network or the wireless communication, and, when the communication environment information is second communication environment information being worse than first communication environment information, the at least one processor is configured to execute the instructions to set a warning area wider than a warning area that is set when the communication environment information is the first communication environment information.

6. The information notification apparatus according to claim 1, wherein the at least one processor is configured to execute the instructions to notify the moving entity of the presence of the detected object via at least one of a wireless communication network or wireless communication between a roadside unit and the moving entity.

7. The information notification apparatus according to claim 6, wherein the notification communication quality information includes notification communication environment information of the wireless communication network and the wireless communication between the roadside unit and the moving entity, and, when the notification communication environment information is second notification communication environment information being worse than first notification communication environment information, the at least one processor is configured to execute the instructions to set a wider warning area than a warning area that is set when the notification communication environment information is the first notification communication environment information.

8. The information notification apparatus according to claim 1, wherein the at least one processor is further configured to execute the instructions to notify the detected object of presence of a moving entity in the warning area.

9. The information notification apparatus according to claim 1, wherein the object is a motorcycle.

10. An information notification method comprising:

detecting an object by using at least one of a plurality of detection methods;

determining a size of a warning area according to information for identifying a detection method used for detecting the object included in detection quality information on detection accuracy of the detected object setting the warning area, around the detected object, of the determined size; and notifying a moving entity in the warning area of the presence of the detected object.

11. A non-transitory computer-readable medium storing a program for causing a computer to perform processing of:

detecting an object by using at least one of a plurality of detection methods;

determining a size of a warning area according to information for identifying a detection method used for detecting the object included in detection quality information;

setting the warning area, around the detected object, of the determined size; and notifying a moving entity in the warning area of the presence of the detected object.

* * * * *